US012738096B2

(12) United States Patent
Niebles et al.

(10) Patent No.: US 12,738,096 B2
(45) Date of Patent: Sep. 15, 2026

(54) SYSTEMS AND METHODS FOR RECOGNIZING HUMAN ACTIONS FROM PRIVACY-PRESERVING OPTICS

(71) Applicants: The Board of Trustees of the Leland Stanford Junior University, Stanford, CA (US); Universidad Industrial de Santander, Bucaramanga (CO)

(72) Inventors: Juan Carlos Niebles, Stanford, CA (US); Carlos Hinojosa, Bucaramanga (CO); Henry Arguello, Bucaramanga (CO); Miguel Marquez, Bucaramanga (CO); Ehsan Adeli-Mosabbeb, Stanford, CA (US); Fei-Fei Li, Stanford, CA (US)

(73) Assignees: The Board of Trustees of the Leland Stanford Junior University, Stanford, CA (US); Universidad Industrial de Santander, Bucaramanga (CO)

( * ) Notice: Subject to any disclaimer, the term of this patent is extended or adjusted under 35 U.S.C. 154(b) by 302 days.

(21) Appl. No.: 18/351,806

(22) Filed: Jul. 13, 2023

(65) Prior Publication Data

US 2024/0021018 A1 Jan. 18, 2024

Related U.S. Application Data

(60) Provisional application No. 63/368,314, filed on Jul. 13, 2022.

(51) Int. Cl.
*G06V 40/20* (2022.01)
*G06F 21/10* (2013.01)
(Continued)

(52) U.S. Cl.
CPC .......... *G06V 40/20* (2022.01); *G06F 21/1066* (2023.08); *G06V 10/774* (2022.01);
(Continued)

(58) Field of Classification Search
CPC .... G06V 40/20; G06V 10/774; G06V 10/776; G06V 10/82; G06V 20/41; G06V 20/52; G06F 21/1066
See application file for complete search history.

(56) References Cited

U.S. PATENT DOCUMENTS 10,535,120 B2 1/2020 Edwards et al.
11,562,244 B2 * 1/2023 Wang .................... G06F 21/577
(Continued)

FOREIGN PATENT DOCUMENTS

WO 2017141102 A1 8/2017
WO 2022266670 A1 12/2022

OTHER PUBLICATIONS

"Geoffrey Letournel, Aurelie Bugeau, Vinh-Thong Ta, Jean-Philippe Domenger. Face De-Identification With Expressions Preservation. International Conference on Image Processing (ICIP) 2015, Sep. 2015, Quebec, Canada. hal-01187654" (Year: 2015).*
(Continued)

*Primary Examiner* — Andrew W Bee
*Assistant Examiner* — D J Dhooge
(74) *Attorney, Agent, or Firm* — KPPB LLP

(57) ABSTRACT

Systems and methods of capturing privacy protected images and performing machine vision tasks are described. An embodiment includes a system that includes an optical component and an image processing application configured to capture distorted video using the optical component, where the optical component includes a set of optimal camera lens parameters $\theta^*_o$ learned using machine learning, performing a machine vision task on the distorted video, where the machine vision task includes a set of optimal action recognition parameters $\theta^*_c$ learned using the machine learning, and generating a classification based on the machine vision task, where the machine learning is jointly (Continued)

trained to optimize the optical element and the machine vision task.

20 Claims, 8 Drawing Sheets

(51) Int. Cl.
*G06V 10/774* (2022.01)
*G06V 10/776* (2022.01)
*G06V 10/82* (2022.01)
*G06V 20/40* (2022.01)

(52) U.S. Cl.
CPC ............ *G06V 10/776* (2022.01); *G06V 10/82* (2022.01); *G06V 20/41* (2022.01)

(56) References Cited

U.S. PATENT DOCUMENTS

| | | | | |
|---|---|---|---|---|
| 2018/0137389 | A1* | 5/2018 | Mathieu | G06F 18/21 |
| 2020/0143079 | A1 | 5/2020 | Sohn et al. | |
| 2021/0076966 | A1 | 3/2021 | Grantcharov et al. | |
| 2021/0209388 | A1* | 7/2021 | Ciftci | G06N 3/045 |
| 2022/0059132 | A1* | 2/2022 | Sun | G06V 20/41 |
| 2022/0066544 | A1* | 3/2022 | Kwon | G06V 20/41 |
| 2023/0083724 | A1* | 3/2023 | Cella | G06Q 30/0206 705/28 |
| 2024/0289990 | A1* | 8/2024 | Niebles | G06V 10/88 |
| 2024/0412491 | A1* | 12/2024 | Sah | G06N 3/045 |

OTHER PUBLICATIONS

International Preliminary Report on Patentability for International Application No. PCT/US2022/073014, Report issued Dec. 14, 2023, Mailed on Dec. 28, 2023, 4 pgs.
International Search Report and Written Opinion for International Application No. PCT/US2022/073014, Search completed Aug. 23, 2022, Mailed Sep. 6, 2022, 17 pgs.
Agrawal et al., "Person De-Identification in Videos", IEEE Transactions on Circuits and Systems for Video Technology, vol. 21, No. 3, Mar. 2011, pp. 299-310, doi: 10.1109/TCSVT.2011.2105551.
Ahmad et al., "Human Action Recognition Using Convolutional Neural Network and Depth Sensor Data", Proceedings of the International Conference on Information Technology and Computer Communications, Aug. 16, 2019, 5 pgs., doi: 10.1145/3355402.3355419.
Bommasani et al., "On the Opportunities and Risks of Foundation Models", arXiv:2108.07258, Jul. 12, 2022, 214 pgs.
Boominathan et al., "PhlatCam: Designed Phase-Mask Based Thin Lensless Camera", IEEE Transactions on Pattern Analysis and Machine Intelligence, vol. 42, No. 7, Jul. 2020, pp. 1618-1629, doi: 10.1109/TPAMI.2020.2987489.
Brkic et al., "I Know That Person: Generative Full Body and Face De-Identification of People in Images", IEEE Conference on Computer Vision and Pattern Recognition Workshops, Jul. 21-26, 2017, pp. 1319-1328, doi: 10.1109/CVPRW.2017.173.
Cao et al., "OpenPose: Realtime Multi-Person 2D Pose Estimation using Part Affinity Fields", IEEE Transactions on Pattern Analysis and Machine Intelligence, vol. 43, No. 1, 2021, 14 pgs., doi: 10.1109/TPAMI.2019.2929257.
Chang et al., "Hybrid optical-electronic convolutional neural networks with optimized diffractive optics for image classification", Scientific Reports, Nature, vol. 8, Aug. 17, 2018, 10 pgs., doi: 10.1038/s41598-018-30619-y.
Chen et al., "Real-time human action recognition based on depth motion maps", Journal of Real-Time Image Processing, vol. 12, Aug. 11, 2013, pp. 155-163, doi: 10.1007/s11554-013-0370-1.
Chen et al., "Tools for Protecting the Privacy of Specific Individuals in Video", EURASIP Journal on Advances in Signal Processing, vol. 2007, Article 75427, Dec. 1, 2007, 9 pgs., doi:10.1155/2007/75427.
Chollet, "Xception: Deep Learning with Depthwise Separable Convolutions", IEEE Conference on Computer Vision and Pattern Recognition, 2017, pp. 1800-1807, doi: 10.1109/CVPR.2017.195.
Deng et al., "ArcFace: Additive Angular Margin Loss for Deep Face Recognition", IEEE/CVF Conference on Computer Vision and Pattern Recognition, Jun. 15-20, 2019, pp. 4685-4694, doi: 10.1109/CVPR.2019.00482.
Dong et al., "Deep Wiener Deconvolution: Wiener Meets Deep Learning for Image Deblurring", Proceedings of the 34th International Conference on Neural Information Processing Systems, vol. 33, Article 89, Dec. 6, 2020, pp. 1048-1059, doi: 10.5555/3495724.3495813.
Dwibedi et al., "Counting Out Time: Class Agnostic Video Repetition Counting in the Wild", IEEE/CVF Conference on Computer Vision and Pattern Recognition, Jun. 13-19, 2020, pp. 10384-10393, doi: 10.1109/CVPR42600.2020.01040.
Fan et al., "RubiksNet: Learnable 3D-Shift for Efficient Video Action Recognition", Computer Vision—ECCV 2020, Lecture Notes in Computer Science, Springer, vol. 12364, Nov. 13, 2020, pp. 505-521, doi: 10.1007/978-3-030-58529-7_30.
Feichtenhofer et al., "Spatiotemporal Residual Networks for Video Action Recognition", Proceedings of the 30th International Conference on Neural Information Processing Systems, Dec. 5, 2016, pp. 3476-3484.
Guo et al., "MS-Celeb-1M: A Dataset and Benchmark for Large-Scale Face Recognition", Computer Vision—ECCV 2016, Lecture Notes in Computer Science, Springer, vol. 9907, Sep. 17, 2016, pp. 87-102, doi: 10.1007/978-3-319-46487-9_6.
He et al., "Deep Residual Learning for Image Recognition", IEEE Conference on Computer Vision and Pattern Recognition (CVPR), Las Vegas, NV, USA, 2016, pp. 770-778, doi: 10.1109/CVPR.2016.90.
He et al., "Imbalanced Learning Foundations, Algorithms, and Applications", Wiley-IEEE Press, 2013, 216 pgs.
Hinojosa et al., "Learning Privacy-preserving Optics for Human Pose Estimation", IEEE/CVF International Conference on Computer Vision, Oct. 10-17, 2021, pp. 2553-2562, doi: 10.1109/ICCV48922.2021.00257.
Hore et al., "Image quality metrics: PSNR vs. SSIM", 20th International Conference on Pattern Recognition, Aug. 23-26, 2010, pp. 2366-2369, doi: 10.1109/ICPR.2010.579.
Huang et al., "Learning to Align from Scratch", Proceedings of the 26th International Conference on Neural Information Processing Systems, vol. 1, Dec. 3, 2012, pp. 764-772.
Ji et al., "Skeleton embedded motion body partition for human action recognition using depth sequences", Signal Processing, vol. 143, Feb. 2018, pp. 56-68, doi: 10.1016/j.sigpro.2017.08.016.
Junejo et al., "View-Independent Action Recognition from Temporal Self-Similarities", IEEE Transactions on Pattern Analysis and Machine Intelligence, vol. 33, No. 1, Jan. 2011, pp. 172-185, doi: 10.1109/TPAMI.2010.68.
Karpathy et al., "Large-scale Video Classification with Convolutional Neural Networks", IEEE Conference on Computer Vision and Pattern Recognition, Jun. 23-28, 2014, pp. 1725-1732, doi: 10.1109/CVPR.2014.223.
Kopuklu et al., "Resource Efficient 3D Convolutional Neural Networks", IEEE/CVF International Conference on Computer Vision Workshop, Oct. 27-28, 2019, pp. 1910-1919, doi: 10.1109/ICCVW.2019.00240.
Krishna et al., "Visual Intelligence through Human Interaction", Human-Computer Interaction Series, Nov. 5, 2021, pp. 257-314, doi: 10.1007/978-3-030-82681-9_9.
Kuehne et al., "Hmdb: A Large Video Database for Human Motion Recognition", International Conference on Computer Vision, Nov. 6-13, 2011, pp. 2556-2563, doi: 10.1109/ICCV.2011.6126543.
Kupyn et al., "DeblurGAN-v2: Deblurring (Orders-of-Magnitude) Faster and Better", IEEE/CVF International Conference on Computer Vision, 2019, pp. 8877-8886, doi: 10.1109/ICCV.2019.00897.
Lakshrninarnyanan et al., "Zernike polynomials: a guide", Journal of Modern Optics, vol. 58, No. 7, Apr. 10, 2011, pp. 545-561, doi: 10.1080/09500340.2011.554896.

(56) References Cited

OTHER PUBLICATIONS

Liu et al., "Spatiotemporal Relationship Reasoning for Pedestrian Intent Prediction", IEEE Robotics and Automation Letters, vol. 5, No. 2, Apr. 2020, pp. 3485-3492, doi: 10.1109/LRA.2020.2976305.
Marquez et al., "Compressive spectral imaging via deformable mirror and colored-mosaic detector", Optics Express vol. 27, No. 13, Jun. 24, 2019, pp. 17795-17808, doi: 10.1364/OE.27.017795.
Marquez et al., "Snapshot compressive spectral depth imaging from coded aberrations", Optics Express vol. 29, No. 6, Mar. 15, 2021, pp. 8142-8159, doi: 10.1364/OE.415664.
Metzler et al., "Deep Optics for Single-shot High-dynamic-range Imaging", IEEE/CVF Conference on Computer Vision and Pattern Recognition, Jun. 13-19, 2020, pp. 1372-1382, doi: 10.1109/CVPR42600.2020.00145.
Moschoglou et al., "AgeDB: the first manually collected, in-the-wild age database", IEEE Conference on Computer Vision and Pattern Recognition Workshops, Jul. 21-26, 2017, pp. 1997-2005, doi: 10.1109/CVPRW.2017.250.
Orekondy et al., "Towards a Visual Privacy Advisor: Understanding and Predicting Privacy Risks in Images", IEEE International Conference on Computer Vision, Oct. 22-29, 2017, pp. 3706-3715, doi: 10.1109/ICCV.2017.398.
Padilla-Lopez et al., "Visual privacy protection methods: A survey", Expert Systems with Applications, vol. 42, No. 9, Jun. 1, 2015, pp. 4177-4195, doi: 10.1016/j.eswa.2015.01.041.
Panagiotakis et al., "Unsupervised Detection of Periodic Segments in Videos", 25th IEEE International Conference on Image Processing, Oct. 7- 10, 2018, pp. 923-927, doi: 10.1109/ICIP.2018.8451336.
Pareek et al., "A survey on video-based Human Action Recognition: recent updates, datasets, challenges, and applications", Artificial Intelligence Review, vol. 54, No. 3, 2021, pp. 2259-2322, doi: 10.1007/s10462-020-09904-8.
Pittaluga et al., "Learning Privacy Preserving Encodings Through Adversarial Training", IEEE Winter Conference on Applications of Computer Vision, Jan. 7-11, 2019, pp. 791-799, doi: 10.1109/WACV.2019.00089.
Pittaluga et al., "Pre-Capture Privacy for Small Vision Sensors", IEEE Transactions on Pattern Analysis and Machine Intelligence, vol. 39, No. 11, Dec. 8, 2016, pp. 2215-2226, doi: 10.1109/TPAMI.2016.2637354.
Pittaluga et al., "Privacy Preserving Optics for Miniature Vision Sensors", IEEE Conference on Computer Vision and Pattern Recognition, Jun. 7-12, 2015, pp. 314-324, doi: 10.1109/CVPR.2015.7298628.
Purwanto et al., "Extreme Low Resolution Action Recognition with Spatial-Temporal Multi-Head Self-Attention and Knowledge Distillation", IEEE/CVF International Conference on Computer Vision Workshop, Oct. 27-28, 2019, pp. 961-969, doi: 10.1109/ICCVW.2019.00125.
Ren et al., "Learning to Anonymize Faces for Privacy Preserving Action Detection", Computer Vision—ECCV 2018, Lecture Notes in Computer Science, Springer, vol. 11205, Oct. 6, 2018, pp. 639-655, doi: 10.1007/978-3-030-01246-5_38.
Ryoo et al., "Extreme Low Resolution Activity Recognition with Multi-Siamese Embedding Learning", The Thirty-Second AAAI Conference on Artificial Intelligence, Article 896, Feb. 2, 2018, pp. 7315-7322.
Ryoo et al., "Privacy-Preserving Human Activity Recognition from Extreme Low Resolution", Proceedings of the Thirty-First AAAI Conference on Artificial Intelligence, Feb. 4, 2017, pp. 4255-4262, doi: 10.1609/aaai.v31i1.11233.
Sandler et al., "MobileNetV2: Inverted Residuals and Linear Bottlenecks", IEEE/CVF Conference on Computer Vision and Pattern Recognition, 2018, pp. 4510-4520, doi: 10.1109/CVPR.2018.00474.
Sengupta et al., "Frontal to Profile Face Verification in the Wild", IEEE Winter Conference on Applications of Computer Vision, Mar. 7-16, 2016, 9 pgs., doi: 10.1109/WACV.2016.7477558.
Sitzmann et al., "End-to-end Optimization of Optics and Image Processing for Achromatic Extended Depth of Field and Super-resolution Imaging", ACM Transactions on Graphics, vol. 37, No. 4, Aug. 2018, pp. 114:1-114:13, doi: 10.1145/3197517.3201333.
Sun et al., "Exploring Sparseness and Self-Similarity for Action Recognition", IEEE Transactions on Image Processing, vol. 24, No. 8, Aug. 2015, pp. 2488-2501, doi: 10.1109/TIP.2015.2424316.
Szegedy et al., "Going Deeper with Convolutions", IEEE Conference on Computer Vision and Pattern Recognition, 2015, 9 pgs., doi: 10.1109/CVPR.2015.7298594.
Szegedy et al., "Rethinking the Inception Architecture for Computer Vision", IEEE Conference on Computer Vision and Pattern Recognition, Jun. 27-30, 2016, pp. 2818-2826, doi: 10.1109/CVPR.2016.308.
Tan et al., "MnasNet: Platform-Aware Neural Architecture Search for Mobile", IEEE/CVF Conference on Computer Vision and Pattern Recognition, Jun. 15- 20, 2019, pp. 2815-2823, doi: 10.1109/CVPR.2019.00293.
Tran et al., "Learning Spatiotemporal Features With 3d Convolutional Networks", Proceedings of the IEEE International Conference on Computer Vision, 2015, pp. 4489-4497, doi: 10.1109/ICCV.2015.510.
Tran et al., "Video Classification with Channel-Separated Convolutional Networks", IEEE/CVF International Conference on Computer Vision, 2019, pp. 5551-5560, doi: 10.1109/ICCV.2019.00565.
Upton, "Fisher's Exact Test", Journal of the Royal Statistical Society. Series A (Statistics in Society), vol. 155, No. 3, May 1992, pp. 395-402, doi: 10.2307/2982890.
Van Der Maaten et al., "Dimensionality Reduction: A Comparative Review", Journal of Machine Learning Research, vol. 10, 2008, pp. 66-71.
Wang et al., "Image Quality Assessment: From Error Visibility to Structural Similarity", IEEE Transactions on Image Processing, vol. 13, No. 4, Apr. 2004, pp. 600-612, doi: 10.1109/TIP.2003.819861.
Wang et al., "Privacy-Preserving Action Recognition Using Coded Aperture Videos", IEEE/CVF Conference on Computer Vision and Pattern Recognition Workshops, 2019, 10 pgs., doi: 10.1109/CVPRW.2019.00007.
Wang et al., "Temporal Segment Networks: Towards Good Practices for Deep Action Recognition", Computer Vision—ECCV 2016, Lecture Notes in Computer Science, Springer, vol. 9912, Sep. 17, 2016, pp. 20-36, doi: 10.1007/978-3-319-46484-8_2.
Wu et al., "Privacy-Preserving Deep Action Recognition: An Adversarial Learning Framework and A New Dataset", IEEE Transactions on Pattern Analysis and Machine Intelligence, vol. 44, No. 4, Sep. 28, 2020, pp. 2126-2139, doi: 10.1109/TPAMI.2020.3026709.
Wu et al., "Towards Privacy-Preserving Visual Recognition via Adversarial Training: A Pilot Study", Computer Vision—ECCV 2018. ECCV 2018. Lecture Notes in Computer Science Springer, vol. 11220, Oct. 6, 2018, pp. 627-645, doi: 10.1007/978-3-030-01270-0_37.
Zagoruyko et al., "Wide Residual Networks", arXiv:1605.07146v4, Jun. 14, 2017, 15 pgs.

* cited by examiner

SYSTEMS AND METHODS FOR RECOGNIZING HUMAN ACTIONS FROM PRIVACY-PRESERVING OPTICS

CROSS-REFERENCE TO RELATED APPLICATIONS

This application claims priority to U.S. Provisional Application Ser. No. 63/368,314, entitled "Systems and Methods for Recognizing Human Actions from Privacy-Preserving Optics" by Niebles et al., filed Jul. 13, 2022, the disclosure of which is herein incorporated by reference in its entirety.

FIELD OF THE INVENTION

The present invention generally relates to the design and implementation of optimized optics for performing machine vision tasks while preserving privacy on captured images.

BACKGROUND

Cameras are optical devices that capture visual images. The majority of cameras use one or more lenses to focus light on a light-sensitive surface. Digital cameras use optical sensors as the light-sensitive surface in contrast to photosensitive film. Digital cameras capture images as image data. While there are many different ways to encode image data, a common way is as a grid of pixels, where each pixel records intensity values. A time-series of images can be viewed (and encoded) as video data.

Computer vision is a scientific field concerned with understanding how computers can gain understanding from image and video data. Computer vision is a broad field, and includes (non-exhaustively) scene reconstruction, object detection, event detection, video tracking, object recognition, pose estimation, motion estimation, among many other applications.

SUMMARY OF THE INVENTION

Systems and methods for capturing privacy preserved images and providing human action recognition (HAR) with machine vision in accordance with embodiments of the invention are described. An embodiment includes a system that includes: an optical component; at least one processor; and memory that includes an image processing application; where the image processing application directs the at least one processor to: capture distorted video using the optical component, wherein the optical component includes a set of optimal camera lens parameters $\theta^*_o$ learned using machine learning; perform a machine vision task on the distorted video, where the machine vision task includes a set of optimal action recognition parameters $\theta^*_c$ learned using the machine learning; and generate a classification based on the machine vision task, where the machine learning is used to concurrently optimize parameters associated with the optical component, the machine vision task, and an adversarial network.

In a further embodiment, the machine learning includes: an optical component neural network trained to learn the set of camera parameters, an action recognition neural network branch trained to perform human action recognition (HAR) on the distorted video; and an adversarial neural network branch that tries to predict private information from the distorted video for a plurality of privacy categories.

In a further embodiment, the privacy categories include at least one category selected from the group consisting of a person's face, skin color, gender, relationship and nudity selection.

In a further embodiment, the action recognition neural network branch includes training a convolutional neural network C to predicts class labels.

In a further embodiment, the machine learning includes performing an optimization process that generates the optimal camera lens parameters $\theta^*_o$ and the optimal action recognition parameters $\theta^*_c$ by computing a loss function formulated as:

$$\theta_o^*, \theta_c^* = \arg\min_{\theta_o,\theta_c} L(O) + L(C) - L(A),$$

where L(O), L(C), and L(A) are the loss functions for the optical component neural network, the action recognition neural network branch, and the adversarial neural network branch respectively.

In a further embodiment, the adversarial neural network branch, the optical component neural network branch and the action recognition neural network branch are concurrently optimized.

In a further embodiment, the optical element includes a camera with two thin convex lenses and a phase mask between the two thin convex lenses.

In a further embodiment, the phase mask visually distorts images to visually obscure at least one privacy attribute of a person.

In a further embodiment, the machine learning is trained to add aberrations to a lens surface of the optical element such that an acquired video is distorted to obscure at least one privacy attribute and to preserve features for HAR.

In a further embodiment, the image processing application directs the at least one processor to preserve temporal information in the distorted video using temporal similarity matrices (TSMs) that keep temporal information similar after distortion by building a TSM for original and private videos and comparing their structures.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
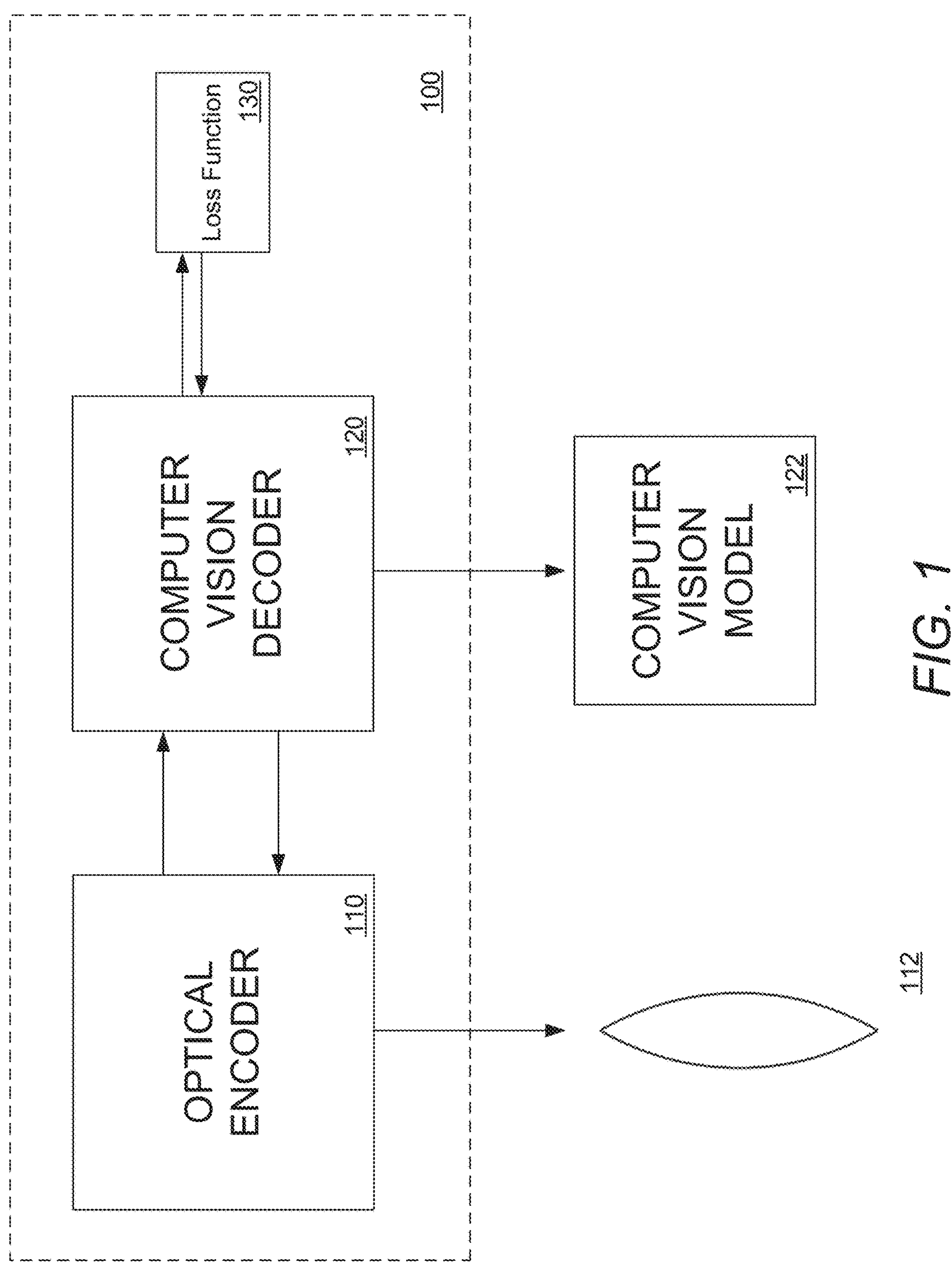
FIG. 1 conceptually illustrates a system for generating a privacy preserving optics and computer vision model in accordance with an embodiment of the invention.

Systems and methods for capturing privacy preserved images and providing human action recognition (HAR) with machine vision in accordance with embodiments of the invention are described. The accelerated use of digital cameras has prompted an increasing concern about privacy and security, particularly in applications such as human action recognition. Accordingly, systems in accordance with many embodiments can include an optimizing framework that provides robust visual privacy protection, with different types of privacy security protections provided at different stages within a human action recognition processing pipeline, including software privacy enhancements and/or hardware components that provide privacy protection and protect and/or prevent access to private data. Systems in accordance with many embodiments can avoid a need for obtaining high quality images to perform machine vision tasks, where the high quality images can be susceptible to access to private information by bad actors by implementing optical components that can only acquire distorted images that have various private attributes protected within the captured images at a hardware image acquisition stage. Systems in accordance with many embodiments can parameterize a camera lens to degrade a quality of images/videos to inhibit privacy attributes and protect against adversarial attacks while maintaining relevant features for different machine vision tasks, including human activity recognition.

Systems in accordance with many embodiments can include a privacy preserving adversarial framework that can include an end-to-end optimization of at least one camera lens and at least one machine vision task, whereby captured images can be distorted to protect and preserve privacy according to different requirements. Many embodiments of the system can perform human action recognition on the captured images for different machine vision tasks using a trained machine learning adversarial framework. Many embodiments can include an optimization process that can incorporate one or more adversarial objectives into a learning process across different canonical privacy categories, including, for example, a person's face, skin color, gender, relationship, and/or nudity detection, among other categories. Systems can preserve temporal information in distorted images/videos using temporal similarity matrices (TSM) and can constrain the structure of the temporal embeddings from the private videos to match the TSM of the original video.

Systems in accordance with many embodiments can preserve privacy in captured images by incorporating aberrations to an optical component to generate distorted images. Many embodiments can include an optical component that includes a camera with two thin convex lenses and a phase mask between them. As can be readily appreciated, different types of optical components, including different types of lenses and/or configurations can be utilized as appropriate to the requirements of specific applications in accordance with embodiments of the invention. Robust privacy protection can be achieved by training an adversarial framework to learn to add aberrations to a lens surface such that acquired videos are distorted to obscure private attributes while still preserving features to achieve high video action recognition accuracy, and being robust to adversarial attacks.

Prior privacy concealing techniques have included relying on hand-crafted strategies, e.g., pixelation, blurring, face/object replacement, and person de-identification, to degrade sensitive information. Certain prior techniques have included an adversarial training strategy to learn to anonymize faces in videos and then perform activity detection. However, prior techniques generally rely on software-level processing of original high-resolution videos, which may already contain privacy-sensitive data. Hence, there is a possibility of these original videos being compromised by a bad actor. Accordingly, systems in accordance with many embodiments provide privacy-protection directly in computer vision within the camera hardware, including an optical component, whereby sensible visual data can be protected before images are acquired in the sensor.

Turning now to FIG. 1, a system for generating a privacy preserving optic and computer vision model in accordance with an embodiment of the invention is illustrated. System 100 includes an optical encoder 110, a computer vision decoder 120, and a loss function 130. In many embodiments, the optical encoder can be a machine learning system which generates simulated images from labeled training data as passed through a model of a lens. In various embodiments, the optical encoder can include a convex thin lens and a refractive/diffractive optical element (freeform lens) add-on. In contrast to the traditional lens design approach, the parametrization of the freeform lens can be learned during training such that aberrations can be added. Then, an optical encoder can generate privacy-preserving images from labeled training data as passed through the lens model. A computer vision decoder can be a machine learning system which attempts to perform a specific computer vision task on images provided by the optical encoder. A loss function can be designed to be privacy preserving and rewards privacy-related attributes such as, but not limited to, a person's face clarity, race, gender, age, and/or any other privacy-related attribute as appropriate to the requirements of specific applications of embodiments of the invention. In many embodiments, accuracy of the computer vision model can also be rewarded. In various embodiments, the optical encoder and computer vision decoder attempt to obtain the highest accuracy in the computer vision model while incrementing the image distortion as much as possible. Both the optical encoder and the computer vision decoder can be updated via back-propagation. Various embodiments of system in accordance with many embodiments are discussed below.

Figure 2:
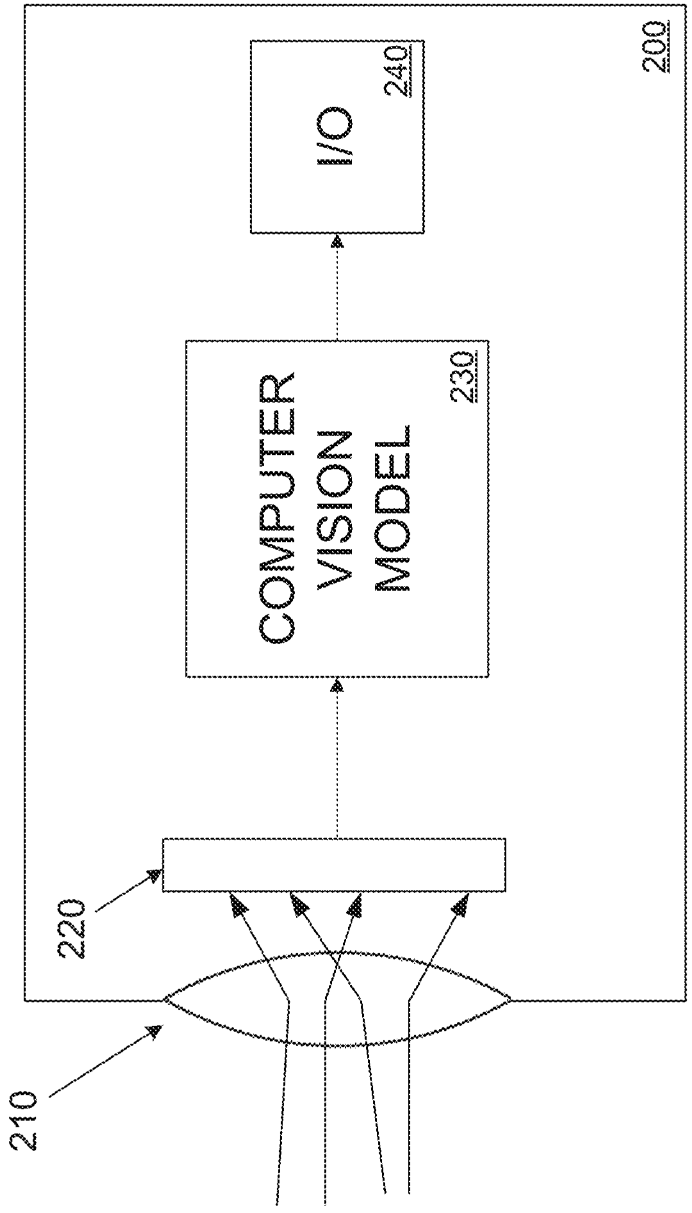
FIG. 2 illustrates a privacy-preserving system architecture that includes a camera with privacy generating optics and a computer vision model in accordance with an embodiment of the invention.

In many embodiments, output of optical encoder 110 is an optic design 112. Similarly, the output of the computer vision decoder 120 is a computer vision model 122. The optic design and computer vision model can be designed to operate with each other in a complete system. Turning now to FIG. 2, a camera utilizing an optic design and computer vision model produced as discussed above is illustrated. Camera 200 includes a privacy-preserving optic 210. Privacy preserving optic 210 may function "poorly" as a lens. That is, it may not preserve high fidelity images as commonly understood, and may be highly irregular. It should be understood that the standard convex lens illustrated in the instant figures is illustrative only, and is not representative of any specific optic design. Light passes through the privacy-preserving optic and strikes image sensor 220. The image sensor passes image data to the computer vision model 230 which may have been generated in concert with the privacy preserving optic. The computer vision model can produce an output which is passed to an input/output (I/O) interface for use in other parts of the system and/or in other systems.

As can be readily appreciated, while one lens is shown in the above, any number of one or more lens from one or more cameras can be configured and generated for use in a privacy-preserving lens stack in accordance with different embodiments. In many embodiments, conventional cameras with conventional optics can be configured into privacy-preserving camera systems by replacing an optical encoder with a firmware encoder which, when embedded into the image sensor, can manipulate the image sensor's output to directly produce a privacy-preserving image. Given that the privacy preservation can occur at the sensor level rather than the optic level, there can be a possibility of an additional vulnerability if a device were able to be accessed by a bad actor.

Systems in accordance with many embodiments can include a camera that can directly obviate sensitive data while still obtaining useful information for one or more machine vision tasks. In many embodiments, a system, including a camera's optical elements and image processing processes and algorithm parameters can be optimized in an end-to-end fashion, enabling designs of domain-specific computational cameras. End-to-end optimization of domain-specific computational cameras can be referred to as Deep Optics, which can aim to improve the optical elements to acquire high-resolution/high-fidelity images and simultaneously improve the performance of computer vision processes and algorithms. Many embodiments of the system can extend this philosophy to design privacy-preserving optical systems.

Many embodiments provide for a privacy-preserving computational camera via end-to-end optimization to capture useful information to perceive humans in the scene while hiding privacy-sensitive information. Since many computer vision applications need to analyze humans as the first step in their frameworks, a system can jointly optimize a freeform lens (e.g., the spatially varying surface height of a lens, among various other attributes) together with a human pose estimation (HPE) neural network to develop a privacy-preserving HPE system. Accordingly, a system can provide a privacy-preserving end-to-end optimization framework to extract useful information from a scene yet preventing the system from obtaining detailed and privacy-sensitive visual data. A system can use an end-to-end optimization framework to optimize an optical encoder (e.g., Hardware-level protection) with a software decoder (e.g., convolutional neural net) to add a visual privacy protection layer to HPE. The optical elements of the camera lens can be jointly optimized and the backbone of a HPE network can be fine-tuned. In many embodiments, it may not be necessary to retrain HPE network layers to achieve privacy preservation. Many embodiments can perform extensive simulations on a dataset (e.g., the COCO dataset) to validate the privacy-preserving deep optics approach for HPE.

Figure 3:
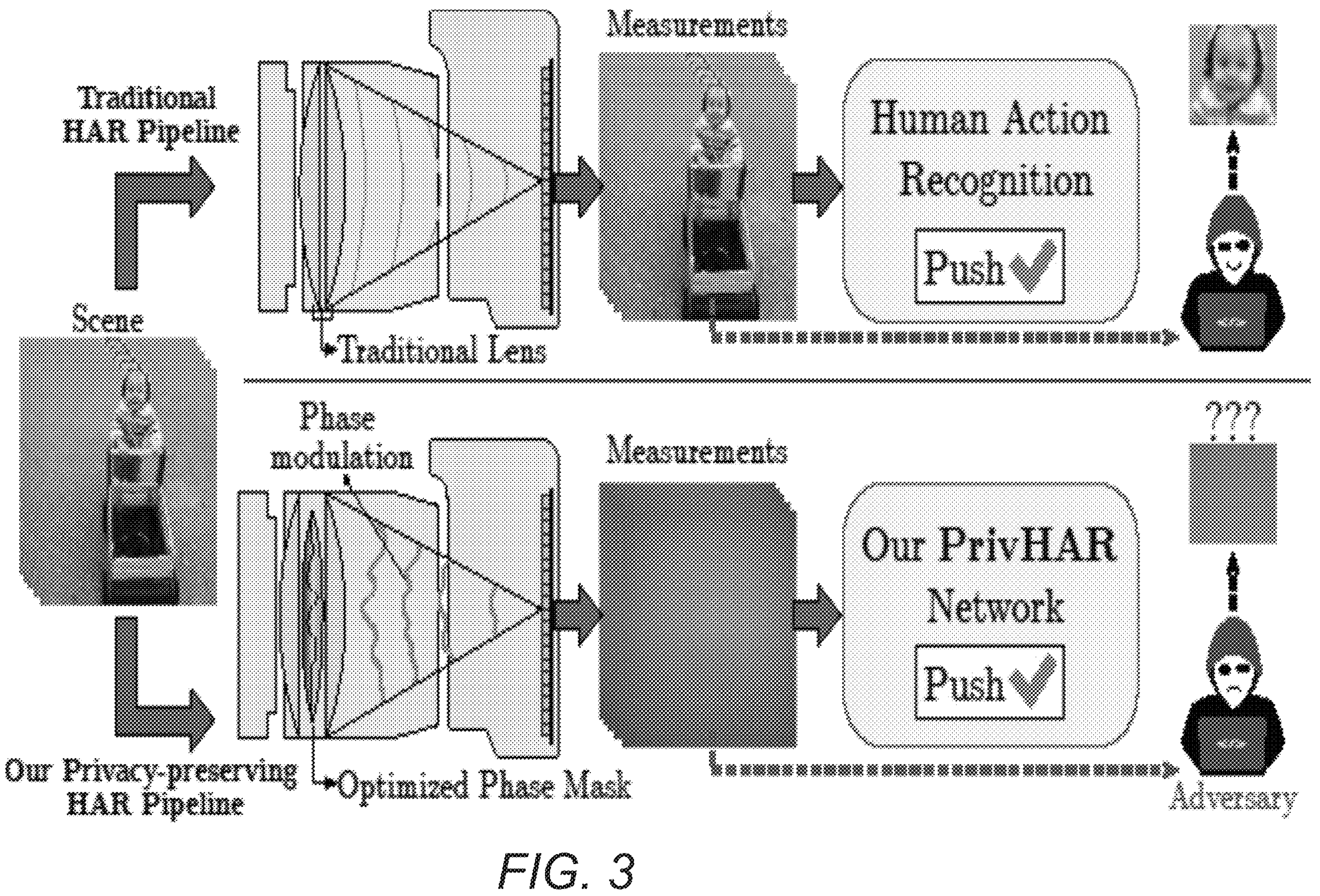
FIG. 3 illustrates a privacy-preserving system architecture including an adversarial optimization framework that learns a lens' phase mask to encode human action features and perform human action recognition (HAR) while obscuring privacy-related attributes in accordance with an embodiment of the invention.

Systems in accordance with many embodiments provide for privacy-preserving human action recognition using an adversarial framework that provides robust privacy protection at different stages along a computer vision processing pipeline. An adversarial framework system with privacy-preserving human action recognition (HAR) in accordance with an embodiment of the invention is illustrated in FIG. 3. As illustrated, the privacy-preserving HAR pipeline can include an optical component that captures images. In many embodiments, an optical component can include two thin convex lenses and a phase mask between to capture distorted images. Different optical components can include different lens structures and/or phase masks as appropriate to the requirements of specific applications. As illustrated in FIG. 3, distorted images can be provided to a trained HAR network for human action recognition. Many embodiments can include end-to-end optimization of at least one camera lens and at least one vision task, with various different optimizations. An optimization can include incorporating adversarial defense objectives into a machine learning process across different canonical privacy categories, including face, skin color, gender, relationship, and/or nudity detection, among others. In many embodiments, an optimization can include providing for distortions in images and/or videos without compromising a training stability by including a structural similarity index (SSIM) in an optimization loss. To preserve temporal information in distorted videos, systems in accordance with many embodiments can use temporal similarity matrices (TSM) and constrain the structure of the temporal embeddings from private videos to match the TSM of the original video.

Systems in accordance with many embodiments can validate a training framework using one or more HAR backbone neural networks. Systems in accordance with many embodiments can be tested using one or more available human action recognition backbone networks. In many embodiments, a testbed can acquire distorted videos and their non-distorted version simultaneously and results in hardware can be matched with simulations. Systems can be configurable based on simulations to take into account a trade-off between HAR accuracy and image distortion level, whereby more robust protection may result in lower HAR accuracy.

Systems in accordance with many embodiments can provide human action recognition for variety of different applications, including video surveillance, human-computer interfaces, virtual reality, video games, sports action analysis, among various other applications.

Systems in accordance with many embodiments can include software-level and/or hardware-level protection, which can be robust to attacks. In many embodiments, hardware-level protections may provide improved security and protection. In particular, systems in accordance with many embodiments can including protecting acquired images at the hardware-level, which can preserve privacy at the image acquisition stage, as opposed to software-level processes that may be able to preserve privacy at a later stage, but may still rely on acquiring high quality images where privacy may not have been protected, and thus potentially leaving those images susceptible to exposure and hacking. Privacy preserving systems that include different hardware-level protections in accordance with many embodiments are described.

Hardware-Level Privacy-Preserving HAR

Privacy preserving systems in accordance with many embodiments can include camera hardware that can provide a layer of security, whereby the camera hardware can remove sensitive data during image sensing. Systems in accordance with many embodiments include an optical component that includes a camera with at least one lens and a phase mask between them. In many embodiments, an optical component can include two thin convex lenses and a phase mask between them. Accordingly, images captured by the optical component can be distorted to preserve privacy. In many embodiments, the system can include an adversarial framework that is trained to learn to add aberrations to a lens surface such that acquired videos are distorted to obscure private attributes while still preserving features. A system can be trained to achieve high video action recognition accuracy and provide protection to adversarial attacks.

Privacy-Preserving Action Recognition

Systems in accordance with many embodiments can be utilized for human action recognition (HAR) from privacy-preserving videos. Systems in accordance with many embodiments provide a framework that can: 1) learn parameters of a robust privacy-preserving optical component (e.g., lens) by backpropagating gradients from an action recognition neural network branch and one or more adversarial neural network branches to an optical component; 2) learn parameters of an action recognition neural network to perform HAR on the private videos with high accuracy; 3) obtain private videos that are robust to adversarial attacks. Adversarial framework systems in accordance with many embodiments can include various components including: an optical component, a action recognition component, and an adversarial neural network component.

Figure 4:
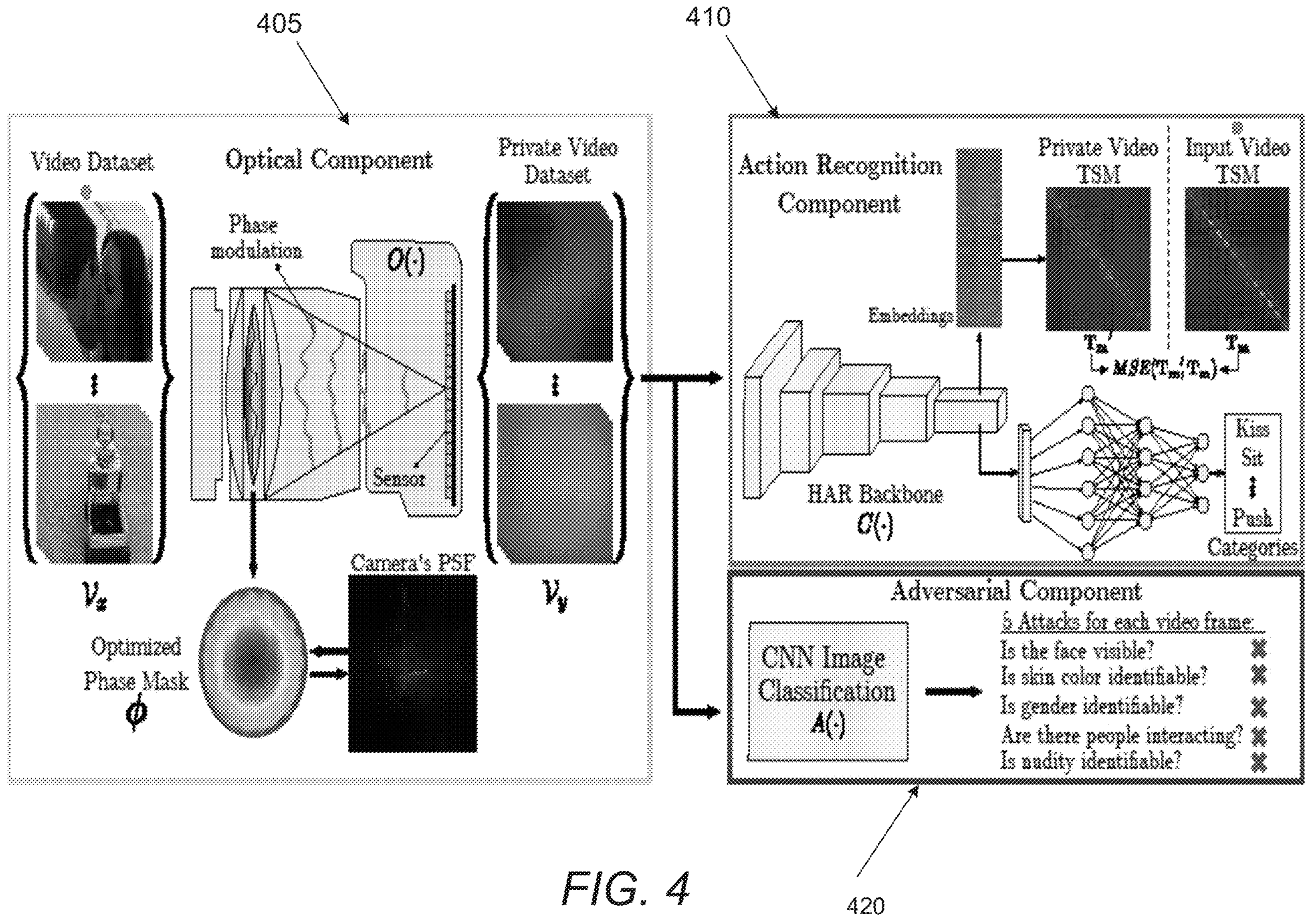
FIG. 4 illustrates an end-to-end system framework that provides privacy protection including training an adversarial framework that learns to add aberrations to a lens surface such that acquired videos are distorted to obscure private attributes while preserving features to achieve high video action recognition accuracy in accordance with an embodiment of the invention.

A system that includes an optical component, an action recognition component and an adversarial component in accordance with an embodiment of the invention is illustrated in FIG. 4. In particular, as illustrated in FIG. 4, an optical component 405 can a camera with two thin convex lenses and a phase mask between them. A simulated camera can take a video $$V_x \in \mathbb{R}_+^{w \times h \times 3 \times T} = \{X_t\}_{t=1}^T$$

as input, which have T frames, and can output a corresponding distorted video $$V_y \in \mathbb{R}_+^{w \times h \times 3 \times T}.$$

Formally, $V_y = O(V_x)$ where the designed camera can be denoted as the function $O(\cdot)$, which distorts every single frame $$X_t \in \mathbb{R}_+^{w \times h \times 3}$$

with w×h pixels, and produces the respective private frames $$Y_t \in \mathbb{R}_+^{w \times h \times 3}.$$

Then, the distorted video $V_y$ can pass through an action recognition component 410 where a convolutional neural network C can predict class labels. In many embodiments, $V_y$ can also pass through an adversarial component 420 where an adversarial network A, illustrated as CNN Image Classification $A(\cdot)$, can try to predict the private information from the distorted video. The three components can include neural networks with trainable parameters. At the end of an optimization process, optimal camera lens parameters $\theta^*_o$ can be obtained, and optimal action recognition parameters $\theta^*_c$. Hence, a loss function of an adversarial framework in accordance with many embodiments can be formulated as follows:

$$\theta_o^*, \theta_c^* = \arg\min_{\theta_o, \theta_c} L(O) + L(C) - L(A), \tag{1}$$

where L(O), L(C), and L(A) can be the loss functions for the optical component 405, action recognition component 410, and adversarial component 420, respectively.

Many embodiments of the system can construct and/or configure, during inference, a camera lens using optimal parameters $\theta^*_o$ that acquires degraded images, on which a network C can perform HAR. Systems in accordance with many embodiments can provide protection directly in optics (e.g., camera lens), to provide enhanced protection and, hence, can be more difficult for a hacker to attack the system to reveal private information (e.g., a person's identity, among others). Systems in accordance with certain embodiments can include hardware and/or software processes that can implement image degradation post-acquisition. Systems in accordance with many embodiments can include hybrid protection that can include an embedded chipset designed to distort images and/or videos immediately after a camera sensor. Accordingly, different protections can be implemented within different hardware and/or software components as appropriate to the requirements of specific applications in accordance with embodiments of the invention. Although FIG. 4 illustrates a particular system architecture for performing HAR from privacy-preserving images, any of a variety of architectures can be utilized as appropriate to the requirements of specific applications in accordance with embodiments of the invention. Systems that include one or more optical components that provide privacy protection in captured images in accordance with embodiments of the invention are described.

Optical Components

Systems in accordance with many embodiments can include an optical component as part of an adversarial HAR framework that can be designed with a phase mask to visually distort images/videos (hence obscuring privacy-sensitive attributes), encode the physical characteristics and preserve human action features to perform HAR. Systems in accordance with many embodiments can couple a modeling and design of two operators in an imaging system: wave propagation and phase modulation, as described.

Image Formation Models

Systems in accordance with many embodiments can model an image acquisition process using a point spread function (PSF) defined in terms of a lens surface profile to emulate the wavefront propagation and train the parameters of a refractive lens. Considering by the Fresnel approximation and the paraxial regime, for incoherent illumination, the PSF can be described by:

$$H(u', v') = \left|\mathcal{F}^{-1}\{\mathcal{F}\{t_L(u, v)\cdot t_\phi(u, v)\cdot W(u, v)\}\cdot T(f_u, f_v)\}\right|^2, \tag{2}$$

where W(u, v) is the incoming wavefront, T(·) represents the transfer function with $(f_u, f_v)$ as the spatial frequencies, $t_\phi(u, v)=\exp(-ik\phi(u, v))$ with $\phi(u, v)$ as the lens phase mask and $k=2\pi/\lambda$ as the wavenumber, $t_L(\cdot)$ denotes the light wave propagation phase with $$t_L(u, v) = \exp\left(-i\frac{k}{2z}(u^2 + v^2)\right)$$

with z as the object-lens distance, $\mathcal{F}\{\cdot\}$ denotes the 2D Fourier transform, and (u', v') is the spatial coordinate on the camera plane. The values of $\phi(\cdot)$ can be modelled via the Zernike polynomials with $\phi(u, v)=\mathcal{R}_{\bar{n}}^{\bar{m}}(\sqrt{u^2+v^2})\cdot\cos(\arctan(v/u))$, where $\mathcal{R}(\cdot)$ represents the radial polynomial function, $\bar{m}$ and $\bar{n}$ are nonnegative integers with $\bar{n}\geq\bar{m}\geq 0$. To train the phase mask values using a HAR network, the phase mask can be discretized $\phi(\cdot)$ as $$\phi = \sum_{j=1}^{q} \alpha_j Z_j, \tag{3}$$

where $Z_j$ denotes the j-th Zernike polynomial in Noll notation, and $\alpha_j$ is the corresponding coefficient. Each Zernike polynomial can describe a wavefront aberration; hence the phase mask $\phi$ is formed by the linear combination of all aberrations. In this regard, the optical element parameterized by $\phi$ can be seen as an optical encoder, where the coefficients $\alpha_j$ determine the data transformation. Therefore, an adversarial training network can find a set of coefficients $$\theta_o^* = \{\alpha_j\}_{j=1}^{q}$$

that provides a maximum visual distortion of a scene but allows to extract relevant features to perform HAR. Using a defined PSF-based propagation model (assuming that image formation is a shift-invariant convolution of the image and PSF), the acquired private images for each RGB channel can be modelled as:

$$Y_\ell = \mathcal{G}_\ell(H_\ell * X_\ell) + \eta_\ell, \tag{4}$$

where $\mathbf{X}_\ell \in \mathbb{R}_+^{w\times h}$ represents the discrete image from the $\ell$ channel, with each pixel value in [0,1]; $\mathbf{H}_\ell$ denotes the discretized version of the PSF in Eq. (2) for the channel $\ell$, $\boldsymbol{\eta}_\ell \in \mathbb{R}^{w\times h}$ represents the Gaussian noise in the sensor, and $\mathcal{G}_\ell(\cdot):\mathbb{R}^{w\times h}\rightarrow\mathbb{R}^{w\times h}$ is the camera response function, which can be modeled as a linear function.

Loss Functions

To encourage image degradation, adversarial framework systems in accordance with many embodiments can train a network to minimize a quality of an acquired image by a camera $Y=\{\{\mathbf{Y}_\ell\}_{\ell=1}^{3}$ in comparison with an original image $X=\{\mathbf{X}_\ell\}_{\ell=1}^{3}$. In many embodiments, instead of maximizing the $\ell_2$ norm error between the two images, adversarial framework systems can use a structural similarity index (SSIM) in an optimization loss to measure quality. The $\ell_2$ norm does not have an upper bound; hence maximizing it to enforce degradation can cause instability in the optimization. On the other hand, the SSIM function is bounded, which can lead to better stability during training. Specifically, the SSIM value ranges between 0 and 1, where values near 1 (better quality) indicate more perceptual similarity between the two compared images. Then, adversarial framework systems in accordance with many embodiments can define the loss function for the camera lens optimization as:

$$L(O) \triangleq SSIM(X, Y). \tag{5}$$

Systems in accordance with many embodiments can provide distortion in a camera's output images/videos, as such the L(O) loss can be minimized in the adversarial training process.

Action Recognition Components

Adversarial framework systems in accordance with many embodiments can include one or more different neural networks to perform human action recognition. Systems in accordance with many embodiments can include two HAR CNN architectures (e.g., a C3D and Rubkisnet, among others) which can provide for improved efficiency for HAR. For a set of private videos, it can be assumed that an output of a classifier C is a set of action class labels $\mathcal{S}_C$. Then, a system can use a standard cross-entropy function $\mathcal{H}$ as the classifier's loss.

Since a degradation model can distort each frame of an input video separately (2D convolution), part of the temporal information may be lost, which can significantly decrease a performance of a HAR CNN. To preserve temporal information, adversarial framework systems in accordance with many embodiments can use temporal similarity matrices (TSMs). TSMs can be useful representations for human action recognition and can be robust against dynamic view changes of a camera when paired with appropriate feature representation. Systems in accordance with many embodiments can use TSMs as a proxy to keep the temporal information (e.g., features) similar after distortion. A system can build a TSM for original and private videos and compare their structures. In particular, a system can use embeddings ê from a last convolutional layer of a HAR CNN architecture and compute the TSM values using the negative of the squared Euclidean distance, e.g., $(T_m')_{n_1 n_2}=-\|\hat{e}_{n_1}-\hat{e}_{n_2}\|^2$. Then, a system can calculate the mean square error (MSE) between the $T_m'$ and the TSM from the input video $T_m$, which can be computed similarly using the last convolutional layer of the corresponding pretrained HAR CNN (non-privacy) network. The action recognition objective can be defined as $$L(C) \triangleq \mathcal{H}(\mathcal{S}_C, C(\mathcal{V}_y)) + MSE(T_m, T_m'), \tag{6}$$

where $\mathcal{V}_y$ denotes the set of E private videos:

$$\mathcal{V}_y = \left\{V_y^e\right\}_{e=1}^{E} = \{O(V_x^e)\}_{e=1}^{E}.$$

Adversarial Components and Training Processes and Algorithms

The attacks that an adversarial agent may perform to a privacy-preserving pipeline can depend on type of privacy that is being implemented. There are different techniques to measure privacy based on a type of application and user preferences among others. For example, in smart homes with video surveillance, one might often want to avoid disclosure of the face or identity of persons. Therefore, an adversarial agent could try to attack a system by training a face detection network. However, there are other privacy-related attributes, such as race, gender, and/or age among others, that an adversarial agent could also wanted to attack. Adversarial frameworks in accordance with many embodiments can define an adversarial attack as a classification problem, where a CNN network A takes a private video $V_y$ as input and tries to predict the corresponding private information. Therefore, a goal of adversarial training can be to try that the predictions from A diverges from the set of class labels $\mathcal{S}_A$ that describe the private information within the scene. In many embodiments, to train an adversarial network, the cross-entropy $\mathcal{H}$ function can be used and an adversarial loss can be defined as:

$$L(A) \triangleq \mathcal{H}(\mathcal{S}_A, A(\mathcal{V}_y)). \tag{7}$$

Algorithm 1 below provides an adversarial training process in accordance with an embodiment of the invention.

Algorithm 1: Our Adversarial Training Algorithm.

Input: Video Dataset $\mathcal{V}_x = \{V_x^e\}_{e=1}^{E}$. Hyperparameters $\beta_o, \beta_c, \beta_a, \gamma_1, \gamma_2$ Output: $\theta_o, \theta_c, \theta_a$

```
  Function Train( V_x, β_o, β_c, β_a, γ_1, γ_2)
1 |   for every epoch do
2 |   |   for every batch of videos V_x^B do
3 |   |   |   V_y^B = O(V_x^B) ▷ Acquire private videos
4 |   |   |   θ_o ← θ_o − β_o Δ_θo(L(O) + γ_1 L(C) − γ_2 L(A))
5 |   |   |   θ_c ← θ_c − β_c Δ_θc(L(C))
6 |   |   |   θ_a ← θ_a − β_a Δ_θa(L(A)
7 |   return X_c
```

In many embodiments of the system, before performing an adversarial training, each framework component separately can be initially trained without privacy concerns to obtain an optimal performance on each task. Specifically, an optical component O can be trained by minimizing 1–L(O) to acquire videos without distortions, e.g., $V_y$ videos are very similar to the corresponding input $V_x$. A HAR network can also be trained C by minimizing $\mathcal{H}(\mathcal{S}_C, C(\mathcal{V}_x))$, to obtain the highest action recognition accuracy (the upper bound). Finally, the adversarial network A can be trained by minimizing $\mathcal{H}(\mathcal{S}_A, A(\mathcal{V}_x))$, thus obtaining the highest classification accuracy (the upper bound). After initialization, an adversarial training can be started, where, for each epoch and every batch, and first acquire the private videos with a camera O. Then, the parameters of the camera $\theta_o$ can be updated by freezing the adversarial network parameters $\theta_a$ and minimizing the weighted sum $L(O)+\gamma_1 L(C)-\gamma_2 L(A)$, shown on line 4 of the Algorithm 1 above. Similarly, parameters of the HAR network $\theta_c$ can be updated by freezing the adversarial network parameters and using the private videos acquired on line 3 of Algorithm 1 to minimize L(C). Finally, an adversarial attack can be performed by minimizing L(A) and updating the parameters of the adversarial network $\theta_a$ while the camera and HAR network parameters are fixed. Adversarial frameworks in accordance with many embodiments can implement a training scheme that can jointly model a privacy-preserving optics with HAR and adversarial attacks during training.

Systems in accordance with many embodiments can include an optical system with a lens that can be designed to degrade image quality and obscure sensitive private information. A visual privacy protection layer can be added to a trained HPE network using the designed optics and fine-tune the backbone layers. There can be a trade-off between the attained scene degradation and the HPE precision.

Figure 5:
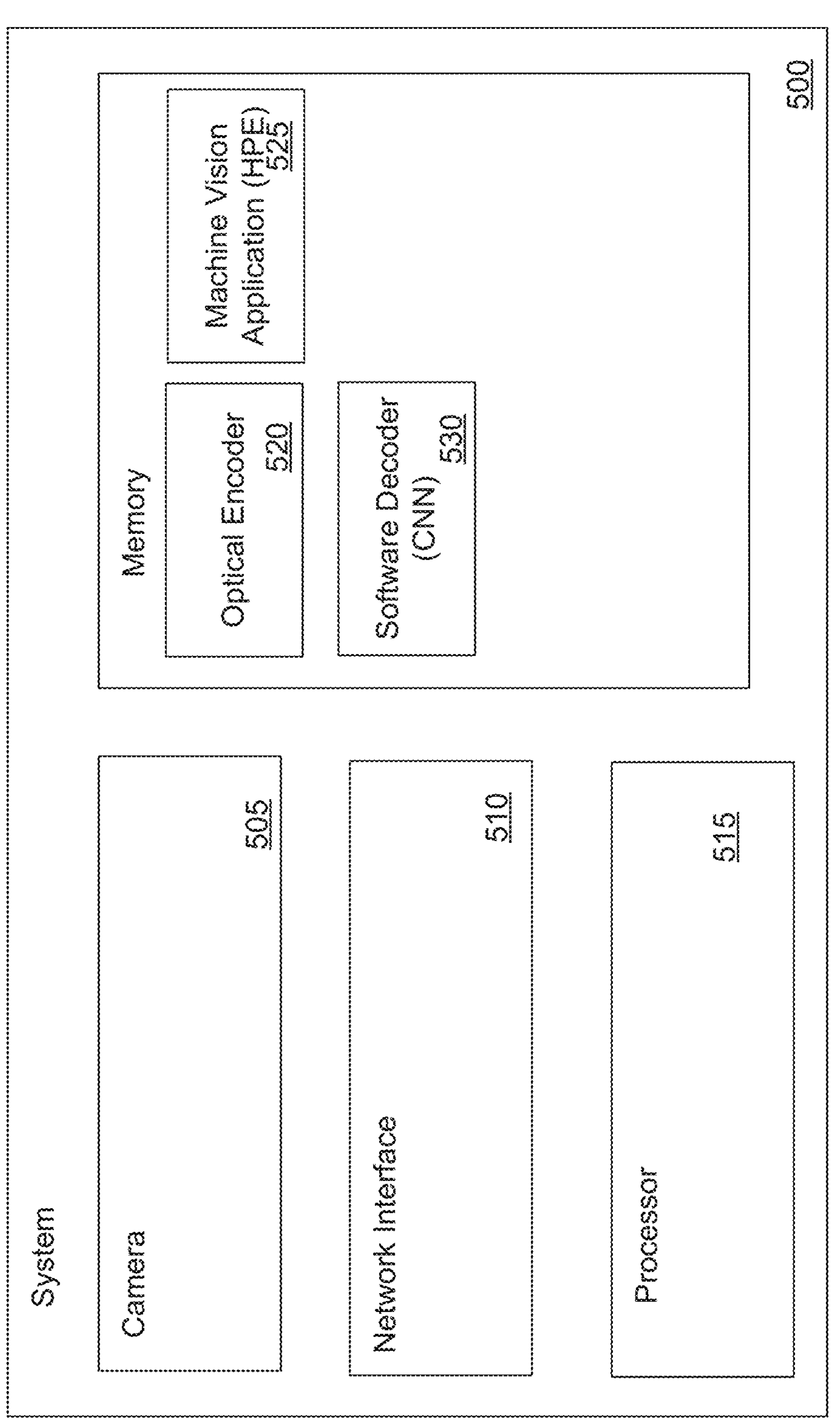
FIG. 5 illustrates a block diagram of a privacy-preserving system for machine vision in accordance with an embodiment of the invention.

A privacy-preserving system for machine vision in accordance with an embodiment of the invention is illustrated in FIG. 5. The system 500 can include one or more cameras 505 that capture images of a surrounding environment, a network interface 510 that can communicate with an external device, a processor, and memory storing one or more different applications. The applications can include an optical encoder 520, one or more machine vision applications 525 such as human pose estimation (HPE) application, and a software decoder 530 such as a Convolutional Neural Network. In many embodiments, the optical encoder 520 can be parametrized for a particular camera lens of the camera 505 in order to generate visually degraded images that protect privacy with respect to one or more attributes (e.g., face, age, race, gender, among others). For example, the optical encoder 520 can acquire images and produce images that obscure the identity of a person but still preserve important features for pose estimation.

In many embodiments, a software decoder (CNN) 525 can perform one or more different machine vision tasks, including human pose estimation (HPE) on optically degraded images provided by the optical encoder 520. Although FIG. 5 illustrates a particular privacy-preserving system for generating visually degraded images and performing machine vision tasks, any of a variety of architectures can be utilized as appropriate to the requirements of specific applications in accordance with embodiments of the invention.

Figure 6:
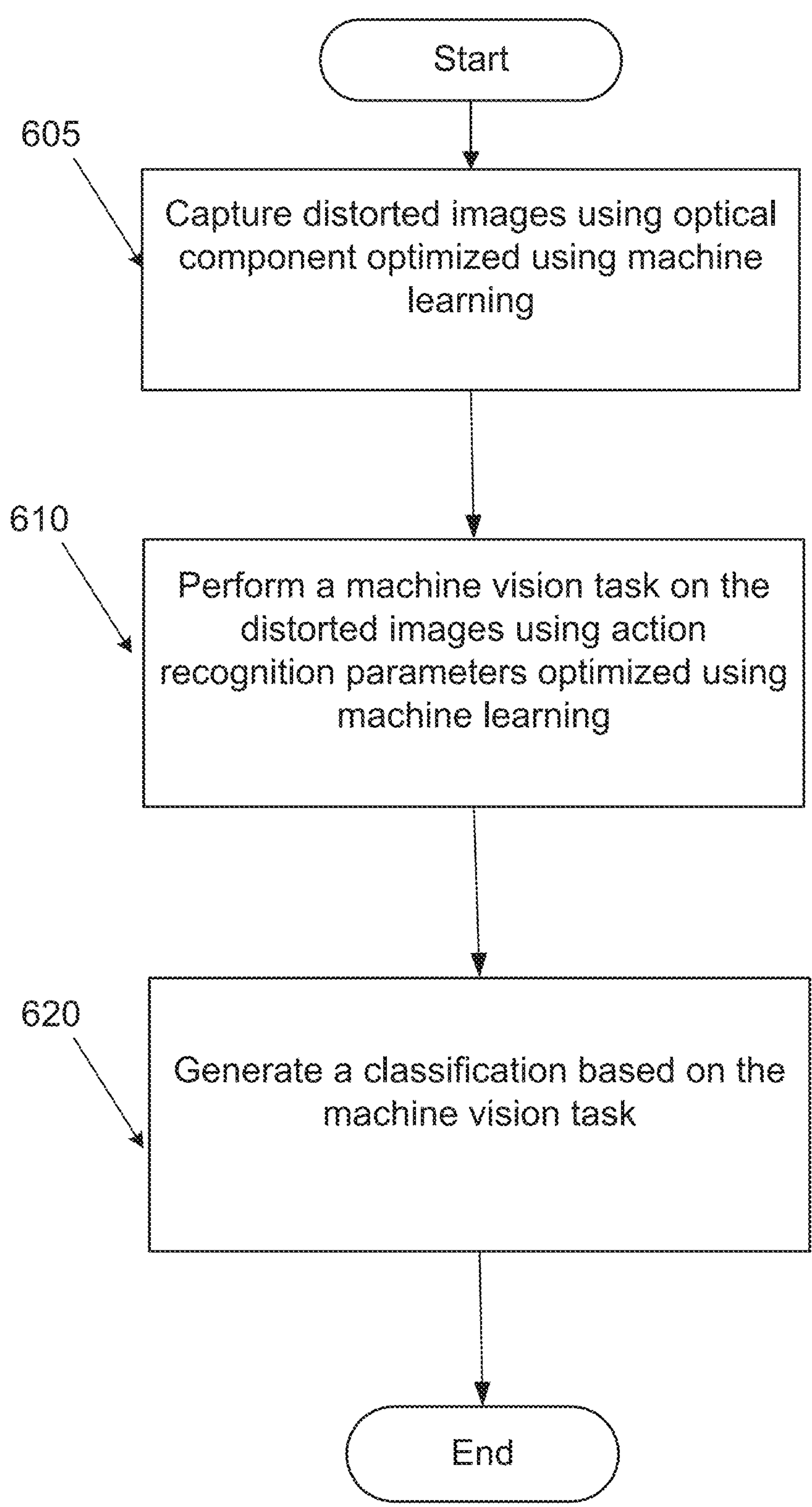
FIG. 6 illustrates a process of performing a machine vision task on privacy protected images in accordance with an embodiment of the invention.

A process for capturing privacy preserved images and performing at least one machine vision task in accordance with an embodiment of the invention is illustrated in FIG. 6. The process can capture (605) distorted images using an optical component that has been optimized using machine learning. The process performs (610) a machine vision task on the distorted images using action recognition parameters optimized using the machine learning. The process generates (620) a classification based on the machine vision task. The process completes. Although FIG. 6 illustrates a specific process for capturing distorted images and performing machine vision using optimizations learned from machine learning, any of a variety of processes including steps performed in different orders can be performed as appropriate to the requirements of specific applications in accordance with embodiments of the invention.

Figure 7:
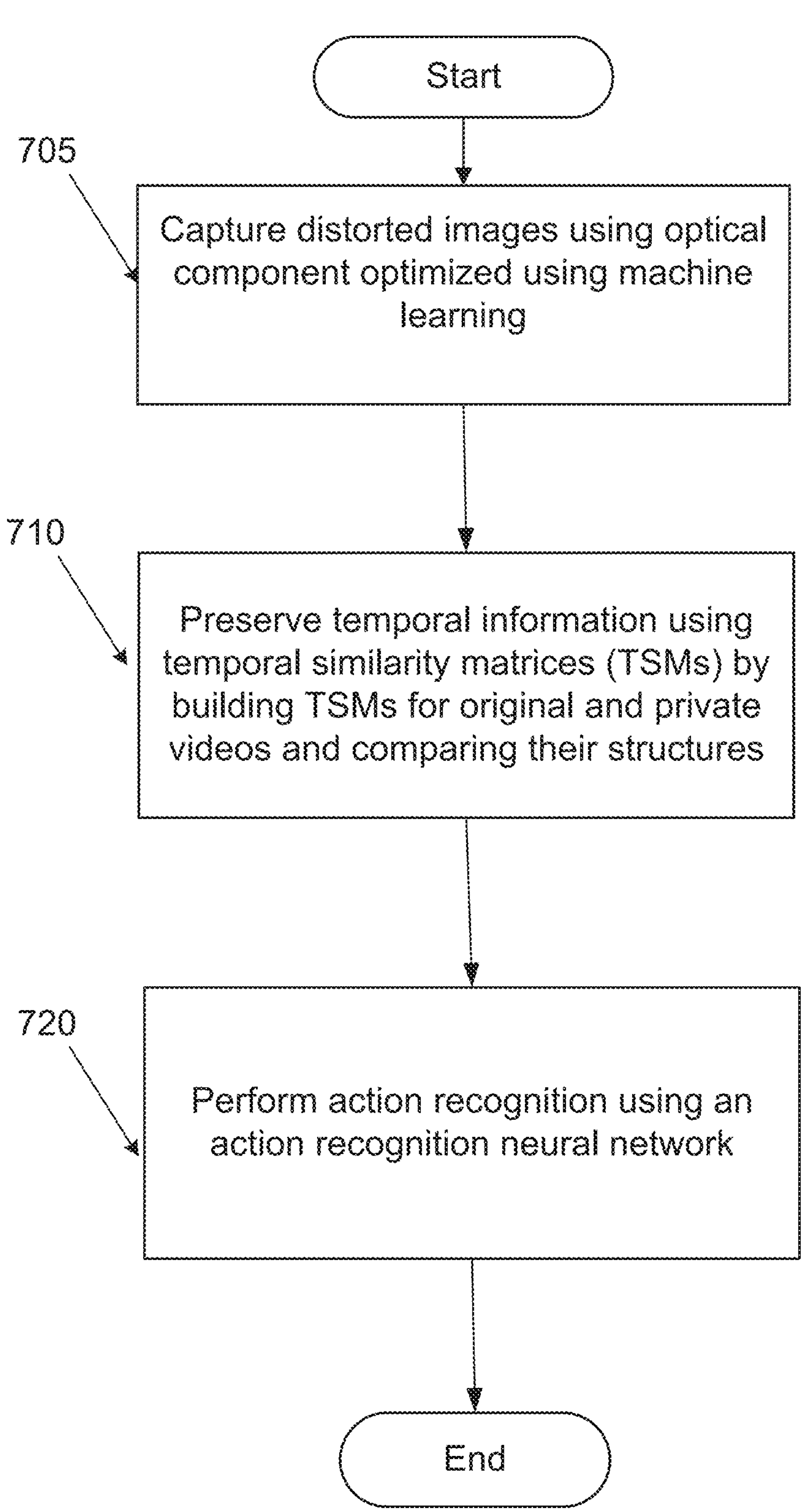
FIG. 7 illustrates a process of preserving temporal information on privacy protected videos to perform accurate action recognition in accordance with an embodiment of the invention.

Systems in accordance with many embodiments can include an action recognition processes that can achieve high video action recognition accuracy. A process of human action recognition in accordance with an embodiment of the invention is illustrated in FIG. 7. The process captures (705) distorted images using an optical component that has been optimized using machine learning. The process uses (710) temporal similarity matrices (TSMs) to preserver temporal information, where the TSMs are used as a proxy to keep the temporal information (features) similar after distortion. In many embodiments, a TSM can be built for original videos and private videos and their structures can be compared. In particular as described, a process can use embeddings e from a last convolutional layer of a HAR CNN architecture and compute the TSM values using the negative of the squared Euclidean distance, e.g., $(T_m')_{n_1 n_2} = -\|\hat{e}_{n_1} - \hat{e}_{n_2}\|^2$. Then, the mean square error (MSE) can be calculated between the $T_m'$ and the TSM from the input video $T_m$, which can be computed similarly using the last convolutional layer of the corresponding pretrained HAR CNN (non-privacy) network.

The process performs (720) action recognition using the action recognition neural network. The process completes. Although FIG. 7 illustrates a specific process for capturing private videos, preserving temporal information and using this temporal information to perform machine vision, any of a variety of processes including steps performed in different orders can be performed as appropriate to the requirements of specific applications in accordance with embodiments of the invention.

Figure 8:
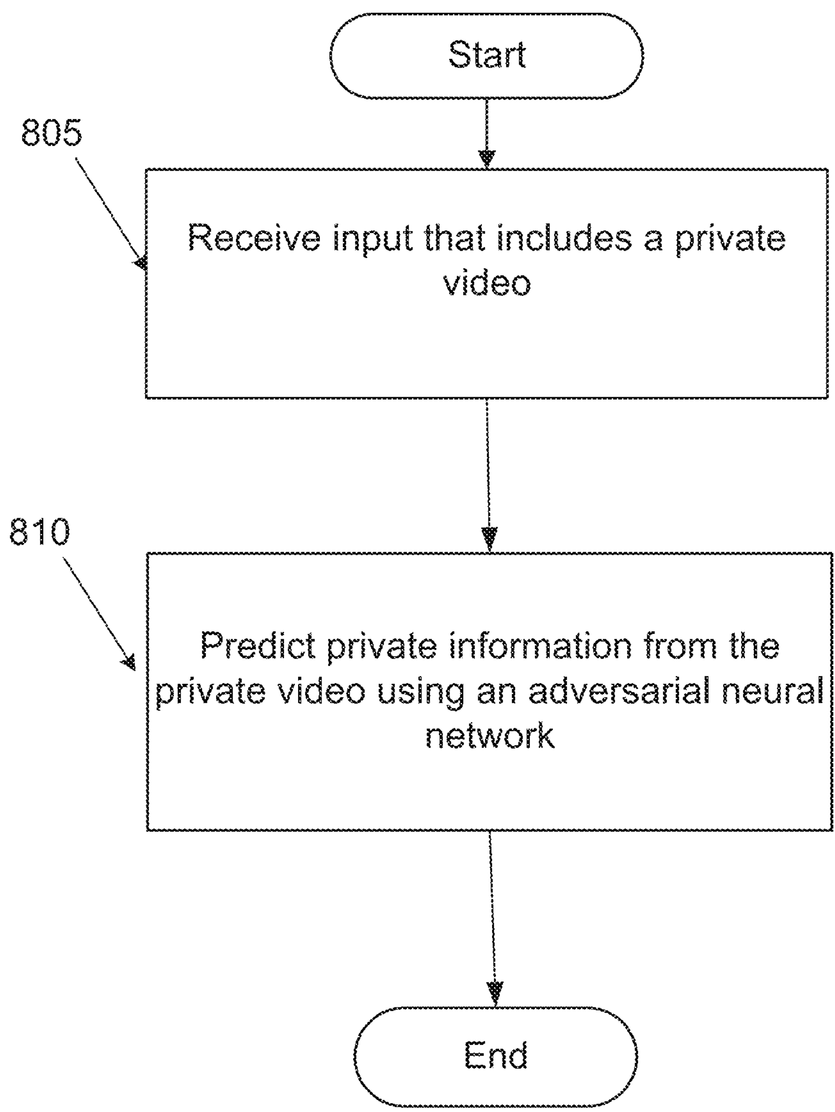
FIG. 8 illustrates a process of adversarial learning where a neural network is trained to predict private attributes from a privacy-protected video while a lens is optimized to avoid privacy leakage in accordance with an embodiment of the invention.

Systems in accordance with many embodiments can include an adversarial neural network that can be trained to improve privacy. A process of training an adversarial neural network in accordance with an embodiment of the invention is illustrated in FIG. 8. The process receives (805) an input that includes a private video. The process predicts (810) private information from the private video using an adversarial neural network. In many embodiments, the adversarial neural network can be trained such that the prediction A diverges from a set of class labels SA that describe private information within a scene of the video. An adversarial network can be trained using various different processes as described, including using a cross-entropy H function and defining an adversarial loss as denoted by equation (7). The process completes. Although FIG. 8 illustrates a specific process for training an adversarial neural network, any of a variety of processes including steps performed in different orders can be performed as appropriate to the requirements of specific applications in accordance with embodiments of the invention.

Although specific systems and methods for privacy-preserving optics and human action recognition are discussed above with respect to FIGS. 1-8, many different systems and methods can be implemented for a variety of different machine vision tasks in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents. Additional disclosure can be found in the appendices below.

What is claimed is:

1. A system, comprising:
- an optical component;
- at least one processor; and
- memory comprising an image processing application;
  - wherein the image processing application directs the at least one processor to:
    - capture distorted video using the optical component, wherein the optical component comprises a set of optimal camera lens parameters that control the distortion of the distorted video;
    - perform a machine vision task on the distorted video, wherein the machine vision task determines a first classification from the distorted video;
    - perform an adversarial classification using an adversarial neural network on the distorted video, wherein the adversarial classification determines whether private information can be determined from the distorted video; and
    - optimize parameters associated with the optical component, the machine vision task, and the adversarial neural network based on the first classification of the distorted video and the adversarial classification.

2. The system of claim 1, wherein optimizing the parameters comprises optimizing parameters of
- an optical component neural network trained to learn the set of optimal camera parameters,
- an action recognition neural network branch trained to perform the machine vision task, wherein the machine vision task is human action recognition (HAR); and
- an adversarial neural network branch that determines whether private information can be determined from the distorted video by predicting private information from the distorted video for a plurality of privacy categories.

3. The system of claim 2, wherein the privacy categories comprise at least one category selected from the group consisting of a person's face, skin color, gender, relationship and nudity selection.

4. The system of claim 2, wherein the action recognition neural network branch comprises a convolutional neural network C trained to predict class labels.

5. The system of claim 2, wherein optimizing the parameters comprises generating the optimal camera lens parameters $$\theta_o^*$$

and the optimal action recognition parameters $$\theta_c^*,$$

by computing a loss function formulated as:

$$\theta_o^*, \theta_c^* = \text{argmin}_{\theta_o,\theta_c} L(O) + L(C) - L(A),$$

where L(O), L(C), and L(A) are the loss functions for the optical component neural network, the action recognition neural network branch, and the adversarial neural network branch respectively.

6. The system of claim 2, wherein the adversarial neural network branch, the optical component neural network and the action recognition neural network branch are concurrently optimized.

7. The system of claim 1, wherein the optical component comprises a camera with two thin convex lenses and a phase mask between the two thin convex lenses.

8. The system of claim 7, wherein the phase mask visually distorts images.

9. The system of claim 7, wherein optimizing parameters associated with the optical component comprises adding aberrations to a lens surface of the optical component such that an acquired video is distorted to obscure at least one privacy attribute and to preserve features for the machine vision task.

10. The system of claim 1, wherein the image processing application directs the at least one processor to preserve temporal information in the distorted video using temporal similarity matrices (TSMs) that keep temporal information similar after distortion by building a TSM for original and private videos and comparing their structures.

11. A method of performing machine vision on videos, the method performed by a system trained using machine learning, wherein the system includes an optical component connectable to a processor, the method comprising:

capturing, using the optical component, a distorted video, wherein the optical component comprises a set of optimal camera lens parameters that control the distortion of the distorted video;

performing a machine vision task on the distorted video, wherein the machine vision task determines a first classification from the distorted video;

performing an adversarial classification using an adversarial neural network on the distorted video, wherein the adversarial classification determines whether private information can be determined from the distorted video; and optimizing parameters associated with the optical component, the machine vision task, and the adversarial neural network based on the first classification of the distorted video and the adversarial classification.

12. The method of claim 11, wherein optimizing the parameters comprises optimizing parameters of an optical component neural network trained to learn the set of optimal camera parameters, an action recognition neural network branch trained to perform the machine vision task, wherein the machine vision task is human action recognition (HAR); and an adversarial neural network branch that determines whether private information can be determined from the distorted video by predicting private information from the distorted video for a plurality of privacy categories.

13. The method of claim 12, wherein the privacy categories comprise at least one category selected from the group consisting of a person's face, skin color, gender, relationship and nudity selection.

14. The method of claim 12, wherein the action recognition neural network branch comprises a convolutional neural network C trained to predict class labels.

15. The method of claim 12, wherein optimizing the parameters comprises generating the optimal camera lens parameters $$\theta_o^*$$

and the optimal action recognition parameters $$\theta_c^*,$$

by computing a loss function formulated as:

$$\theta_o^*, \theta_c^* = \text{argmin}_{\theta_o,\theta_c} L(O) + L(C) - L(A),$$

where L(O), L(C), and L(A) are the loss functions for the optical component neural network, the action recognition neural network branch, and the adversarial neural network branch respectively.

16. The method of claim 12, wherein the adversarial neural network branch, the optical component neural network and the action recognition neural network branch are concurrently optimized.

17. The method of claim 11, wherein the optical component comprises a camera with two thin convex lenses and a phase mask between the two thin convex lenses.

18. The method of claim 17, wherein the phase mask visually distorts video.

19. The method of claim 17, wherein optimizing parameters associated with the optical component comprises adding aberrations to a lens surface of the optical component such that an acquired video is distorted to obscure at least one privacy attribute and to preserve features for the machine vision task.

20. The method of claim 11, further comprising preserving temporal information in the distorted video using temporal similarity matrices (TSMs) that keep temporal information similar after distortion by building a TSM for original and private videos and comparing their structures.

* * * * *